United States Patent [19]

Vilmi et al.

[11] Patent Number: 6,075,999

[45] Date of Patent: *Jun. 13, 2000

[54] HANDS FREE EQUIPMENT

[75] Inventors: Toivo Vilmi, Haukipudas; Aki Leppanen, Salo, both of Finland

[73] Assignee: Nokia Mobile Phones, Ltd, Salo, Finland

[ * ] Notice: This patent issued on a continued prosecution application filed under 37 CFR 1.53(d), and is subject to the twenty year patent term provisions of 35 U.S.C. 154(a)(2).

[21] Appl. No.: 08/861,892

[22] Filed: May 22, 1997

Related U.S. Application Data

[63] Continuation of application No. 08/371,379, Jan. 11, 1995, Pat. No. 5,642,402.

[30] Foreign Application Priority Data

Jan. 13, 1994 [FI] Finland ...................................... 940174

[51] Int. Cl.[7] ...................................................... H04Q 7/20
[52] U.S. Cl. ............................................ 455/569; 455/557
[58] Field of Search .................................... 455/550, 569, 455/570, 557, 575; 379/433, 428

[56] References Cited

U.S. PATENT DOCUMENTS

| | | | |
|---|---|---|---|
| 5,151,946 | 9/1992 | Martensson | 379/38 |
| 5,189,358 | 2/1993 | Tomura et al. | 320/2 |
| 5,190,325 | 3/1993 | Doss-Desouza | 292/251.5 |
| 5,212,722 | 5/1993 | Murata | 379/58 |
| 5,282,246 | 1/1994 | Yang | 379/455 |
| 5,301,224 | 4/1994 | Major | 379/58 |
| 5,307,401 | 4/1994 | Matsuda | 379/59 |
| 5,313,514 | 5/1994 | Kanasashi | 379/58 |
| 5,361,459 | 11/1994 | Hyvonen et al. | 24/35 |
| 5,490,213 | 2/1996 | Huang | 379/442 |

FOREIGN PATENT DOCUMENTS

| | | |
|---|---|---|
| 0 464 011 | 1/1992 | European Pat. Off. . |
| 0 494 780 | 7/1992 | European Pat. Off. . |
| 2 206 765 | 1/1989 | United Kingdom . |
| 2 255 687 | 11/1992 | United Kingdom . |
| WO 92/14328 | 8/1992 | WIPO . |
| WO 94/22234 | 9/1994 | WIPO . |

OTHER PUBLICATIONS

Finnish Office Action and English Translation thereof, dated Aug. 10, 1994, Nokia Mobile Phones Ltd. FI 940174.

*Primary Examiner*—William G. Trost
*Attorney, Agent, or Firm*—Perman & Green, LLP

[57] ABSTRACT

Hands free equipment for mobile phones, has an extra loudspeaker and microphone and an electronic unit included therein, the equipment being mainly intended for use in cars, whereby driving safety is maintained. The equipment Is connected to the charger of the cigarette lighter. The hands free equipment according to the invention consists of a separate, small-sized, detachable and movable unit situated outside the mobile phone.

13 Claims, 3 Drawing Sheets

HANDS FREE EQUIPMENT

This is a continuation of Ser No. 08/371,379 filed on Jan. 11, 1995 now U.S. Pat. No. 5,642,402.

FIELD OF THE INVENTION

This invention relates to hands free equipment for use with a radio telephone, the equipment being suitable for use in automobiles.

BACKGROUND OF THE INVENTION

Known hands free (HF) equipment are disclosed in patent publications WO 92/14328 and GB 2 206 765. This invention is intended to further develop the HF equipment to provide a cheaper, simpler and more portable solution. The HF equipment in accordance with the invention comprises a separate, small-sized, detachable and transferable unit located outside the radio telephone. The HF equipment does not use the radio telephone's internal microphone as that requires modification of the software and the couplings within the telephone. The HF microphone in accordance with the invention, when compared to the radio telephone microphone, is a different type, is of higher quality and has a different directional sensitivity. Suitably the HF microphone apparatus also compensates for any background noise. In current known radio telephones the HF facility is implemented either fully or partially within the telephone. Thus only the HF microphone, the amplifier, the loudspeaker and the amplifier for the loudspeaker are outside the telephone. The HF equipment in accordance with the invention is further provided with a facility for charging the radio telephone. The HF equipment can also be used in existing radio telephones by altering the bottom coupler connection to suit each model.

SUMMARY OF THE INVENTION

According to a first aspect of the present invention there is provided hands free equipment for use with a radio telephone comprising a lead for connecting the radio telephone to a cigarette lighter socket, wherein the lead is detachably connectable to the telephone and the cigarette lighter socket and is provided with a loudspeaker and a microphone.

Hands free equipment in accordance with the invention has the advantage that it provides a single apparatus solution for using a portable telephone in hands free mode. The lead is detachable from the radio telephone and the cigarette lighter socket. This has the advantage of allowing the hands free equipment to be portable such that it may be carried in the pocket.

Suitably the lead of the hands free equipment also serves as a means for charging the telephone from a power supply in the cigarette lighter socket, typically found in an automobile.

Ideally, the speaker and the microphone of the hands free equipment is housed in the cigarette lighter charger and the system connector respectively. This has the advantage of reducing the number of separate components of the hands free equipment and consequently provides a simpler solution that may reduce manufacturing costs.

By locating the speaker in the housing of the cigarette lighter charger, the speaker may also be provided with an amplifier. The advantage of this arrangement is that the amplifier may be powered from the charging circuitry and thus does not impose any load on the radio telephone battery.

According to a second aspect of the present invention there is provided hands free equipment for radio telephones, comprising an extra loudspeaker and an extra microphone and an electronic unit included therein, the equipment being mainly intended for use in cars, whereby driving safety is maintained, the equipment being connected to the charger of the cigarette lighter, characterised in that the hands free equipment consists of a separate, small-sized, detachable and movable unit situated outside the radio telephone and that the extra loudspeaker is situated in the charger of the cigarette lighter and that the extra microphone is situated in the system connector.

An embodiment of the invention comprises a radio telephone charger unit, for connection to a cigarette lighter socket (i.e. a cigarette lighter charger), provided with a loudspeaker and a microphone coupled to the cigarette lighter charger and an electronic unit situated inside the radio telephone. This HF equipment is particularly small, easy to move, advantageous to implement and can be carried in a pocket.

A second embodiment of the invention comprises a loudspeaker and a microphone coupled to the system connector of the mobile phone and an electronic unit situated inside the radio telephone. This embodiment is a slightly more expensive solution compared to the former because it comprises an extra part.

A third embodiment of the invention comprises HF equipment with a loudspeaker and a microphone, using the charger electronics of the cigarette lighter charger, to the wire between the cigarette lighter charger and the radio telephone, and includes an electronic unit situated Inside the radio telephone. In this embodiment the coupler to the cigarette lighter socket is small and fits most cars without difficulty. The position of the loudspeaker is movable. If the loudspeaker is enclosed, the cables with their connectors and the microphone with its cables can be placed within it tidily. It is easy to further attach the enclosed loudspeaker to different places in the car: for example, it can be suspended on the coupler of the cigarette lighter and secured in a suitable, desired place using a Velcro tape.

One embodiment of the invention comprises a loudspeaker and a microphone coupled to the system connector of the telephone using a threaded cable and an electronic unit placed inside the radio telephone. This embodiment also comprises two products and, consequently, is slightly more expensive to manufacture.

One embodiment of the invention further comprises the loudspeaker placed in the housing of the cigarette lighter charger and a microphone placed in the housing of the system connector for the radio telephone. This embodiment results in a very small HF equipment and if two smaller loudspeakers are used in the charger part on either side of the contact surfaces instead of one larger element, an even smaller size can result.

The radio telephone is placed in the HF mode by making a call when the telephone is in its holder. When the telephone is picked up by hand, the audio lines of the telephone are directed to the telephone's internal microphone and receiver. The directing element can be a Hall-sensor inside the telephone (a "cold" rack can be made) or a switch connected to the coupler part.

DETAILED DESCRIPTION OF EMBODIMENTS OF THE INVENTION

Figure 1:
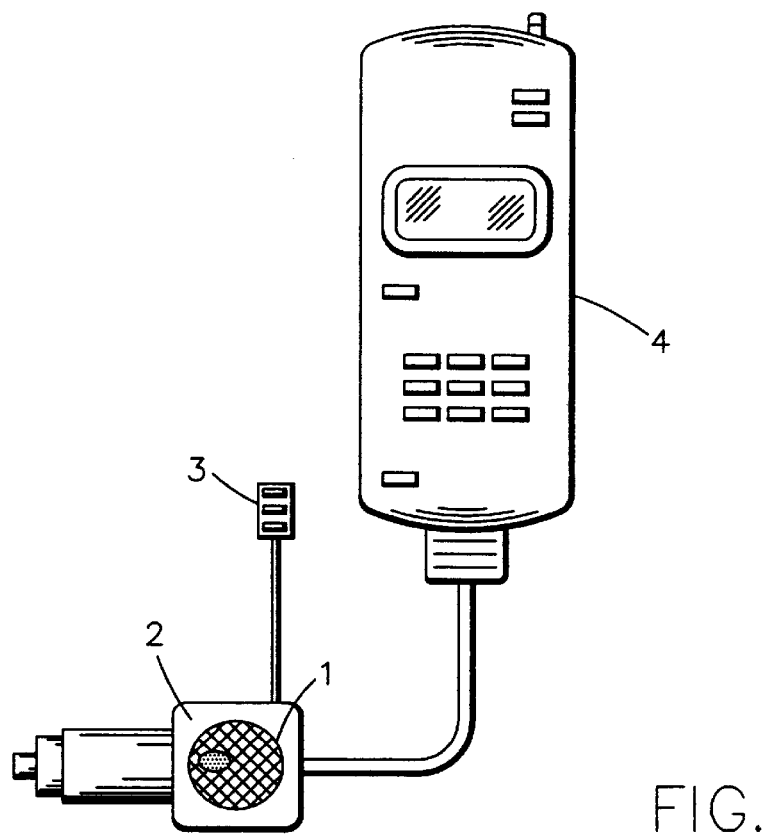

The invention will now be described, by way of example, with reference to the accompanying drawings, in which:

FIG. 1 shows a loudspeaker 1 situated in a cigarette lighter charger 2. Microphone 3 is coupled to the cigarette lighter charger 2. The electronic unit is placed inside radio telephone 4.

Figure 2:
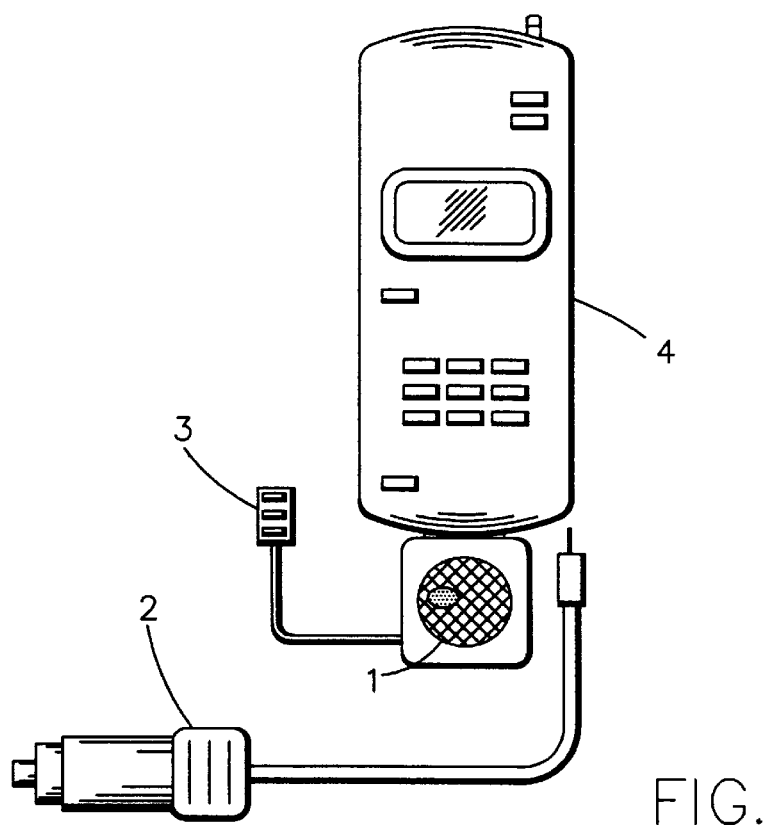

FIG. 2 shows a loudspeaker 1 and a microphone 3 coupled to a system connector in the base of radio telephone 4. The electronic unit is situated inside mobile phone 4. This embodiment employs the present cigarette lighter charger 2.

Figure 3:
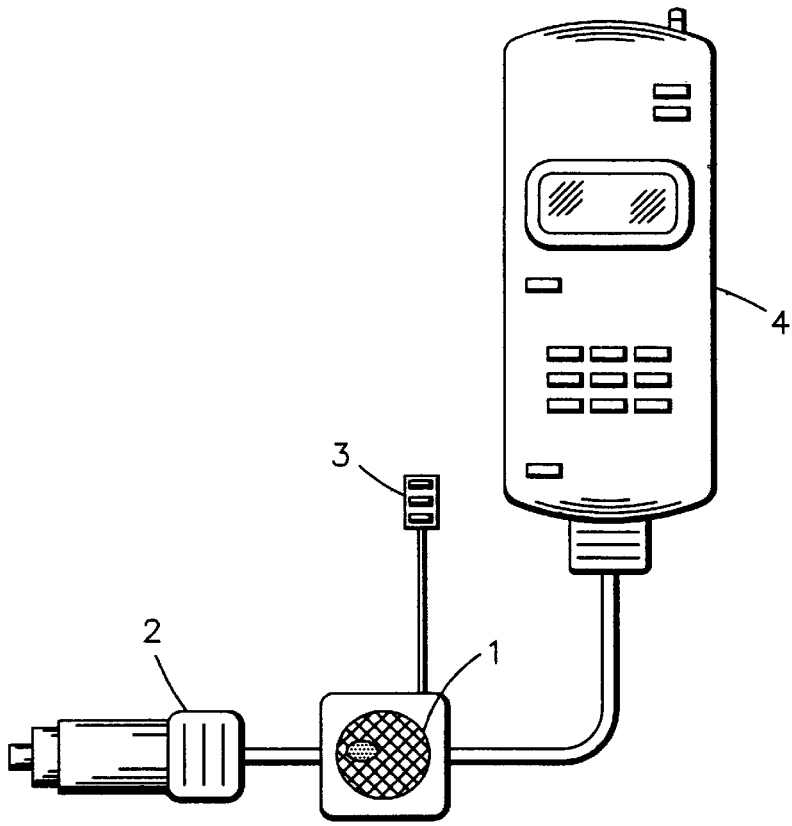

FIG. 3 shows HF equipment with its loudspeaker 1 and microphone 3, using the electronics of the cigarette lighter charger 2, coupled to the wire between the cigarette lighter charger 2 and the radio telephone 4. The electronic unit is inside the radio telephone 4.

Figure 4:
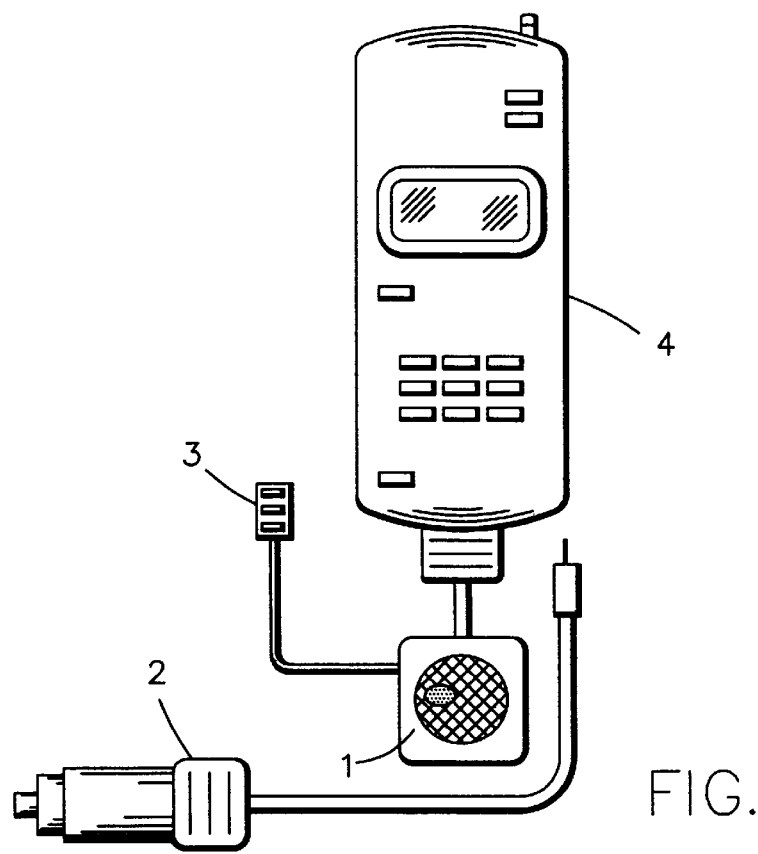

FIG. 4 shows a loudspeaker 1 and a microphone 3 coupled to the system connector in the base of the radio telephone 4 using a cable. The electronic unit is situated inside the radio telephone 4.

Figure 5:
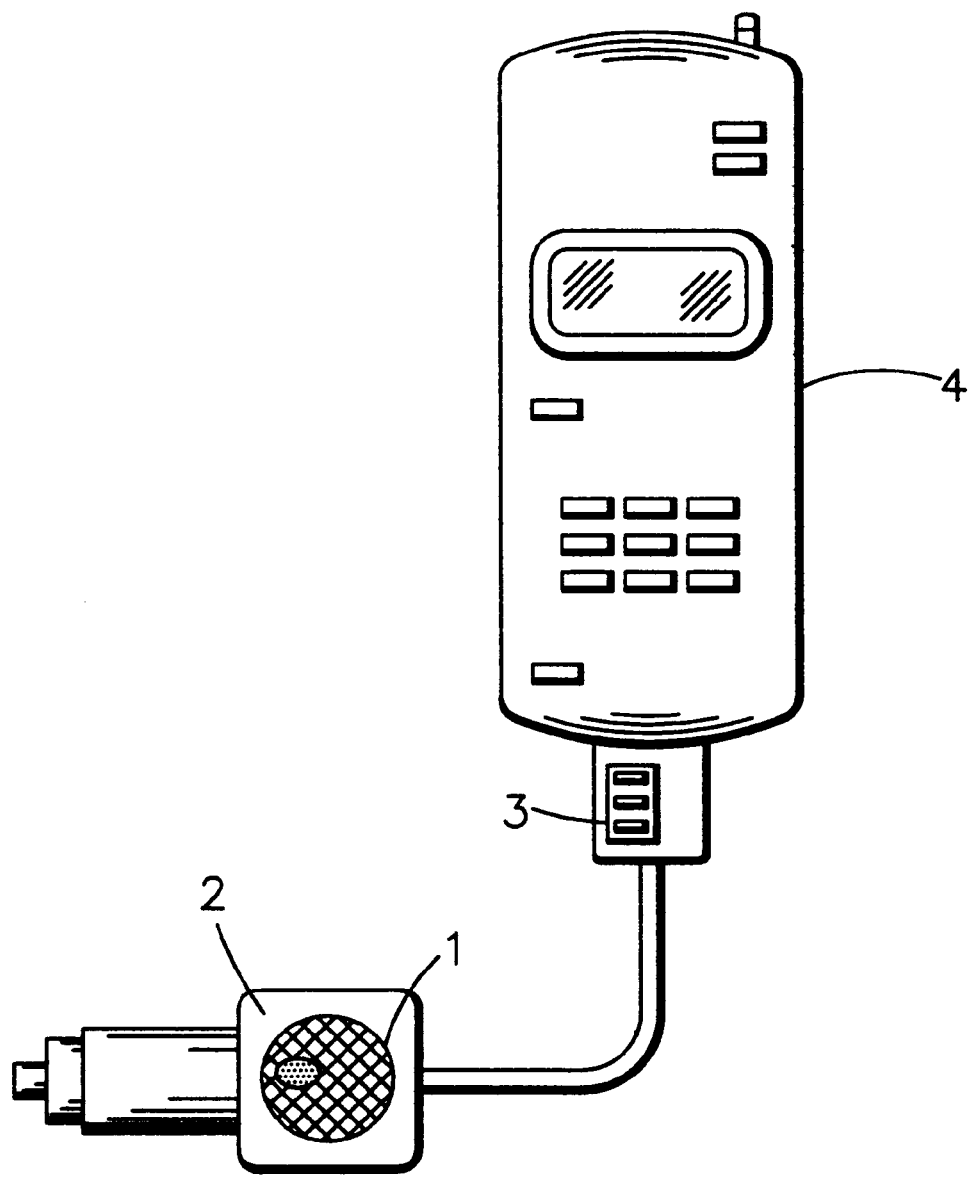

FIG. 5 shows a loudspeaker 1 situated in the housing of the cigarette lighter charger 2. Microphone 3 is situated in the housing of the system connector located in the base of radio telephone 4. The electronic unit in this embodiment is also situated inside the radio telephone 4.

If an external antenna is used, the antenna coupling can be taken from the coupler located on the base of the radio telephone 4 or from the side of the cigarette lighter charger after the threaded cable.

What is claimed is:

1. Hands free equipment for use with a radio telephone, comprising a microphone, a loudspeaker, and a lead for connecting the telephone to a cigarette lighter socket, said lead having at one end thereof a first connector for detachable connection to the radio telephone and at an opposing end thereof a second connector for detachable connection to the lighter socket, said second connector comprising a one piece housing member, wherein said loudspeaker is arranged in said housing member, and wherein said microphone is arranged substantially adjacent said one end of said lead.

2. Hands free equipment as claimed in claim 1, wherein the second connector comprises means for supplying power to the hands free equipment from the cigarette lighter socket.

3. Hands free equipment as claimed in claim 1, wherein the hands free equipment further comprises a cigarette lighter charger.

4. Hands free equipment as claimed in claim 1, wherein the second connector is provided with charging circuitry for charging the radio telephone.

5. Hands free equipment as claimed in claim 1, wherein the second connector comprises amplifying means for the loudspeaker.

6. Hands free equipment as claimed in claim 1, wherein the second connector comprises means for supplying power to the amplifying means from the cigarette lighter socket.

7. Hands free equipment as claimed in claim 1, wherein the microphone is coupled to the second connector.

8. Hands free equipment as claimed in claim 1, wherein said lead is for charging the radio telephone from the cigarette lighter socket and wherein said housing member further comprises a charger unit.

9. Hands free equipment as claimed in claim 8, wherein the charger unit contains charging circuitry for charging the radio telephone.

10. Hands free equipment as claimed in claim 8, wherein the charger unit contains amplifying means for the loudspeaker.

11. Hands free equipment as claimed in claim 10, wherein the charger unit comprises means for supplying power to the amplifying means from the cigarette lighter socket.

12. Hands free equipment as claimed in claim 1, wherein the microphone is coupled to the charger unit.

13. Hands free equipment for use with a radio telephone, comprising a first connector, a second connector, a microphone and a lead having a first end and a second end, said lead having said first connector arranged at said first end of said lead and said second connector arranged at said second end of said lead, and wherein said first connector is a unitary member for insertion into a cigarette lighter socket and comprises a loudspeaker, and wherein said second connector is for connection to said radio telephone, and wherein said microphone is positioned substantially adjacent said second end of said lead.

* * * * *